United States Patent [19]
Perry et al.

[11] Patent Number: 5,527,395
[45] Date of Patent: *Jun. 18, 1996

[54] METHOD OF CLEANING AND MAINTAINING POTABLE WATER DISTRIBUTION PIPE SYSTEMS WITH A HEATED CLEANING SOLUTION

[75] Inventors: Edward C. Perry, Phoenix; Jerome H. Ludwig, Paradise Valley, both of Ariz.

[73] Assignee: H.E.R.C. Products Incorporated, Phoenix, Ariz.

[*] Notice: The term of this patent shall not extend beyond the expiration date of Pat. No. 5,360,488.

[21] Appl. No.: 626,601

[22] Filed: Jun. 20, 1994

Related U.S. Application Data

[63] Continuation-in-part of Ser. No. 209,953, Mar. 17, 1994, which is a continuation-in-part of Ser. No. 36,188, Mar. 23, 1993, Pat. No. 5,360,488, which is a continuation-in-part of Ser. No. 700,780, May 16, 1991, Pat. No. 5,322,635.

[51] Int. Cl.$^6$ ................. B08B 9/02; C23G 1/02
[52] U.S. Cl. ................. 134/3; 134/10; 134/22.13; 134/41
[58] Field of Search ................. 134/3, 10, 22.12, 134/22.14, 22.11, 22.13, 41; 137/240; 252/142, 82, 549, 546, DIG. 11

[56] References Cited

U.S. PATENT DOCUMENTS

| | | | |
|---|---|---|---|
| 1,194,542 | 8/1916 | Raymond | 134/169 C |
| 1,892,093 | 12/1932 | Battistella | 134/10 |
| 3,095,379 | 6/1963 | Schwartz | 252/101 |
| 3,169,545 | 2/1965 | Kolling | 137/209 |
| 3,281,268 | 10/1966 | Martin | 134/10 |
| 3,424,688 | 1/1969 | Boiko et al. | 252/87 |
| 3,527,609 | 9/1970 | Vinso | 134/3 |
| 3,667,487 | 6/1972 | Schoenbeck | 134/108 |
| 3,969,255 | 7/1976 | Connelly, Jr. | 252/87 |
| 4,025,359 | 5/1977 | Connelly, Jr. | 134/3 |
| 4,032,460 | 6/1977 | Zilch et al. | 252/8.55 |
| 4,220,550 | 9/1980 | Frenier et al. | 252/180 |
| 4,276,185 | 6/1981 | Martin | 134/3 X |
| 4,541,945 | 9/1985 | Anderson et al. | 252/149 |
| 4,780,150 | 10/1988 | Anderson et al. | 134/3 |
| 4,789,406 | 12/1988 | Holder et al. | 134/3 |
| 4,806,169 | 2/1989 | Späne et al. | 134/3 |
| 4,818,298 | 4/1989 | Shishkin et al. | 134/22 |
| 4,872,919 | 10/1989 | Bucher et al. | 134/3 |
| 4,971,631 | 11/1990 | Sallee et al. | 134/3 |
| 5,045,352 | 9/1991 | Mueller | 427/235 |
| 5,199,995 | 4/1993 | Shoji et al. | 134/2 |

FOREIGN PATENT DOCUMENTS

| | | |
|---|---|---|
| 2602571 | 2/1988 | France . |
| 533818 | 2/1986 | Spain . |
| 9220629 | 11/1992 | WIPO . |

*Primary Examiner*—Jan H. Silbaugh
*Assistant Examiner*—Saeed T. Chaudhry
*Attorney, Agent, or Firm*—Wood, Herron & Evans

[57] ABSTRACT

A method of cleaning and maintaining potable water distribution systems which have reduced flow due to an increase of scale, tuberculation, sediment, and the like on the inside surface of the pipe is disclosed. An aqueous acidic cleaning solution is heated and circulated through the pipe to be treated for a sufficient time to dissolve and loosen the scale and sediment, and the spent solution containing dissolved or suspended scale and sediment is flushed from the pipe to provide a cleaned pipe with improved water flow. It is also desirable to flush the water distribution pipe system with high pressure water after the treatment to remove loosened scale and sediment that was not removed during the circulation and flushing of the treating solution.

23 Claims, 1 Drawing Sheet

5,527,395

METHOD OF CLEANING AND MAINTAINING POTABLE WATER DISTRIBUTION PIPE SYSTEMS WITH A HEATED CLEANING SOLUTION

RELATED APPLICATIONS

This application is a continuation-in-part of application Ser. No. 08/209,953, filed Mar. 17, 1994, which in turn is a continuation-in-part of application Ser. No. 08/036,188, filed Mar. 23, 1993, now U.S. Pat. No. 5,360,488, which also claims the benefit of application Ser. No. 07/700,780, filed May 16, 1991 of which this is a continuation-in-part application, now U.S. Pat. No. 5,322,635, and the disclosures of all of these applications are incorporated herein in their entireties by reference.

BACKGROUND OF THE INVENTION

It is well known that hardness, microorganisms and suspended solids in water sources vary widely in composition depending on the source and will result in scale deposition including microbial tuberculation and sedimentation on surfaces wherever water is used. Scale deposition and sedimentation is particularly troublesome in water distribution pipe systems which service the residential and commercial customers of municipalities, private water companies and the like along with industrial process water distribution pipe systems as found in the mining, petroleum, agriculture and the like industries. In these systems, the formation of scale, tuberculation and sediment can reduce the water flow through the pipe system which will limit the capacity of the pipe to service the requirements of the customers or to provide the required water necessary for an industrial process, irrigation, etc. For instance, in municipal systems an increase in the fire risk would be obvious if the fire hydrant did not supply sufficient water to extinguish the fire due to scale, tuberculation and sediment deposits in the feed pipe line. At some point, the water distribution pipe would have to be replaced due to these restrictions at a high cost and with prolonged interruption of service.

Additionally, scale, tuberculation and sedimentation will increase the possibility of corrosion in the water distribution pipe along with promoting the growth of other organisms. The organisms also can be a health hazard, promoting corrosion and biomass which binds scale and sediment together and to the surfaces of the system. Corrosion can eventually lead to the leakage of the system and the necessity to replace the leaking section.

The microbiological tuberculation found in water distribution pipes and wells are typically due to iron and manganese bacteria that attach themselves to the walls of the pipe and live on the soluble iron or manganese in the water along with other nutrients. Their spaghetti-like features also allow them to trap all particulate matter which is present in the water.

There are over 20 different iron bacteria that have been characterized. As part of their metabolism, they convert ferrous ion to ferric ion which results in iron oxide (rust) accumulation in the tuberculation. Manganese bacteria convert manganous ion to manganic ion which results in manganese dioxide accumulation in the tuberculation in the water pipe. After generations of bacteria, the iron oxide, manganese dioxide, particulate matter and biomass accumulation on the side of the pipe results in mounds of tuberculated "growth" annalogous to a coral reef.

As the tuberculation grows, flow becomes increasingly restricted and turbulent. This leads to red water and turbidity complaints by consumers. Restricted flow results in low pressure complaints and poor hydrant performance. Tuberculation can also interfere with valve and hydrant performance and operation. There can also be corrosive sulfate reducing bacteria that live under the tuberculation and cause pipe corrosion.

Strong acids have been used to clean water wells, however, submersible pumps are removed prior to treatment to prevent corrosion by the acids employed. Also, organic acids, mixtures of mineral acids and organic acids or inhibited acid compositions have been found to clean water wells without the necessity of removing the pumps or other equipment. These methods for cleaning water wells have involved static and surging treatment.

A proper cleaning and maintenance program for water distribution systems will prevent decreased water flow capacity, corrosion and the necessity to replace the system or portions thereof. A simple and effective method for cleaning and maintaining these systems is needed.

SUMMARY OF THE INVENTION

This invention is directed to a method of cleaning and maintaining water distribution systems by employing cleaning solutions at elevated temperatures. Water systems having interior scale and sediment deposits are cleaned by introducing and circulating an effective amount of an aqueous treatment solution for a sufficient period of time at an elevated temperature which results in the solution, loosening and suspension of the undesired scale and sediment. The scale is associated with sulfate-reducing and iron bacteria consisting primarily of iron oxide, biomass and sediment. As developed above and hereinafter, other bacteria such as manganese bacteria may be involved in the microbial tuberculation found in water distribution pipes. Thus, "scale" as the term is used herein, is intended to include microbial tuberculation associated with such bacteria or other bacteria. Thereafter, the spent treating solution containing the dissolved or suspended scale and sediment is flushed from the water distribution system to provide a clean system with improved water flow and operation. Additionally, further flushing with high pressure water will also remove additional scale that had been loosened by the treating solution.

It has been found that potable water distribution systems may be cleaned and maintained by employing cleaning or treating solutions at elevated temperatures. In general, temperatures on the order of about 40° to about 80° C. have been employed and, more particularly, from about 40° C. to about 50° C. By employing elevated temperatures, water distribution pipes may be cleaned of tuberculation more rapidly, for example, tuberculated pipes cleaned at ambient temperature over a period of about twelve hours may be cleaned in a matter of about 1–2 hours where the cleaning solution has been elevated in temperature to about 75° to 80° C.

The cleaning solution may be acidic, neutral or basic. In the most preferred form, in potable water pipe systems, mineral acids or organic acids, and mixtures thereof, are employed as acidic treatment solutions. The acidic treatment solution may contain further additives such as inhibitors, chelating agents, penetrating and/or dispersing agents to assist in the removal of scale and sediment and to minimize any adverse effects on the pipes, valves, or other system surfaces due to the acids employed.

This invention provides a simple, low cost and effective method of removing water scale and sediment from water distribution systems in order to maintain proper water flow, operation and to prevent corrosion of the system which would require the high cost and inconvenience of replacement.

Other advantages and objectives of this invention will be further understood with reference to the following detailed description and drawings.

DETAILED DESCRIPTION OF THE INVENTION

Among the acidic treatment solutions found to be useful in practicing the method of this invention are aqueous solutions of mineral acids such as hydrochloric, nitric, phosphoric, polyphosphoric, hydrofluoric, boric, sulfuric, sulfurous, and the like. Aqueous solutions of mono-, di- and polybasic organic acids have also been found to be useful and include formic, acetic, propionic, citric, glycolic, lactic, tartaric, polyacrylic, succinic, p-toluenesulfonic, and the like. The useful treatment solutions may also be aqueous mixtures of the above mineral and organic acids.

Alkaline, acid, or neutral cleaning solutions may also be employed, as indicated above, depending upon the type of scale that needs to be removed. Sequestering or chelating agents such as EDTA (ethylenediamine tetraacetic acid), NTA (nitrilotriacetic acid), and derivatives, i.e., basic alkali salts, and the like have also been found to be useful in the treatment solution in certain cases.

The acidic treatment solution may also contain acid inhibitors which substantially reduce the acidic action on metal surfaces of the water distribution system, particularly valves, fire hydrants, etc., and these various inhibitors for acids have been well documented in the patent art. Typical, but not necessarily all inclusive, examples of acid inhibitors are disclosed in the following U.S. Pat. Nos.: 2,758,970; 2,807,585; 2,941,949; 3,077,454; 3,607,781; 3,668,137; 3,885,913; 4,089,795; 4,199,469; 4,310,435; 4,541,945; 4,554,090; 4,587,030; 4,614,600; 4,637,899; 4,670,186; 4,780,150 and 4,851,149 which are incorporated herein by reference.

The treatment solution may also contain dispersing, penetrating or emulsifying agents to assist in the removal of the scale and sediment. These surface active agents may be anionic, cationic, nonionic or amphoteric as defined in the art. Compounds such as alkyl ether sulfates, alkyl or aryl sulfates, alkanolamines, ethoxylated alkanolamides, amine oxides, ammonium and alkali soaps, betaines, hydrotropes such as sodium aryl sulfonates; ethoxylated and propoxylated fatty alcohols and sugars, ethoxylated and propoxylated alkylphenols, sulfonates, phosphate esters, quarternaries, sulfosuccinates, and mixtures thereof, have been found to be useful in admixture with the acid treating solution.

BRIEF DESCRIPTION OF THE DRAWINGS

With reference to FIG. 1, a laboratory test system is shown to evaluate the removal of scale and sediment by acidic treating solutions from a test pipe sample taken from a water distribution system. This system includes a 15 gallon acidic treating solution reservoir 5, submersible acidic treating solution circulation pump 6 rated at 1200 gallons per hour, 1" inlet transfer line 7, drain valve 8, heavy rubber diaphragm seals 9 for the ends of the test pipe specimen 10, 1" outlet transfer line 11 and the treating solution 12. The test pipe specimen 10 is mounted at about a 30 degree angle so that the test solution will contact essentially the entire inner pipe surface to be treated.

A laboratory test, for example, was run on a four foot section of 6" diameter pipe which had been removed from a potable water distribution system that had been used for over 40 years. The scale on the inside of the pipe consisted of tuberculated nodules of up to 1 to 1½ inches in height covering 100% of the inside pipe surface which had substantially reduced the opening inside the pipe for water to flow. Analysis of the scale indicated it consisted of primarily iron with some calcium, magnesium and manganese in the form oxides, hydroxides and carbonates along with fine mineral acid insoluble solids and some "biomass". This is typical scale associated with manganese and iron bacteria along with the associated corrosion.

About 10 gallons of a 12.5% aqueous inhibited hydrochloric/glycolic acid solution containing a penetrating agent was placed in the reservoir 5 and circulated through the test pipe 10 for a period of 24 hours at ambient temperature of about 25°–30° C. After 2 hours of circulation, particles of the scale were breaking loose and could be heard in the outlet transfer line 11 and observed entering the reservoir 5. The color of the treating solution also became increasingly darker with circulation time. After 24 hours the circulation was stopped and the system was drained of the treating solution. The diaphragms 9 were removed and the inside of the test pipe was observed to be about 80% cleaned of scale and sediment solids.

On treating the test pipe with a second identical treating solution for a period of 21.5 hours, about 80% of the interior surface of the test pipe was observed to still be covered over with a scale and/or sediment that was a soft and paste-like semi-solid which contained some grit and could be easily removed with a probe. The remaining scale nodules had been substantially reduced in size since the end of the first treatment. It was concluded that the second treatment would probably not be necessary if a high pressure water flush was employed to remove the insoluble soft sediment which had coated the remaining scale nodules after the first treatment.

Figure 1:
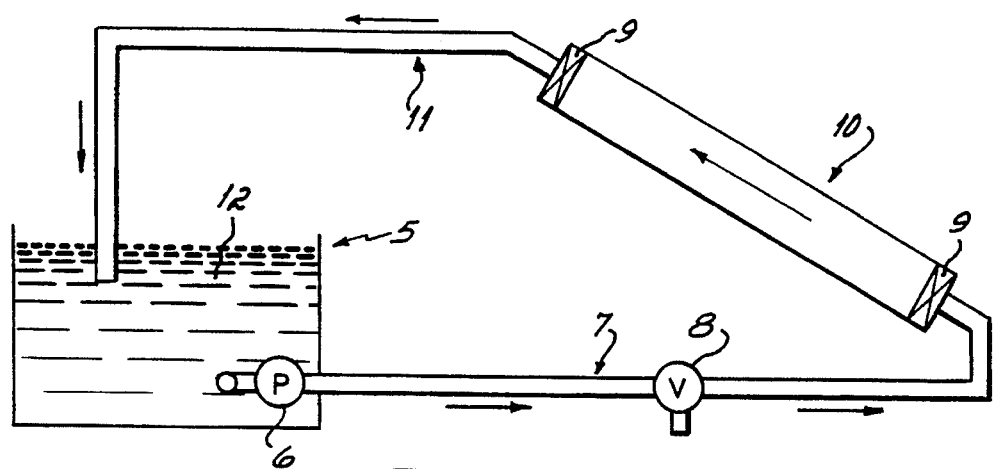
FIG. 1 is a schematic of a laboratory test system illustrating the method of this invention.
Figure 2:
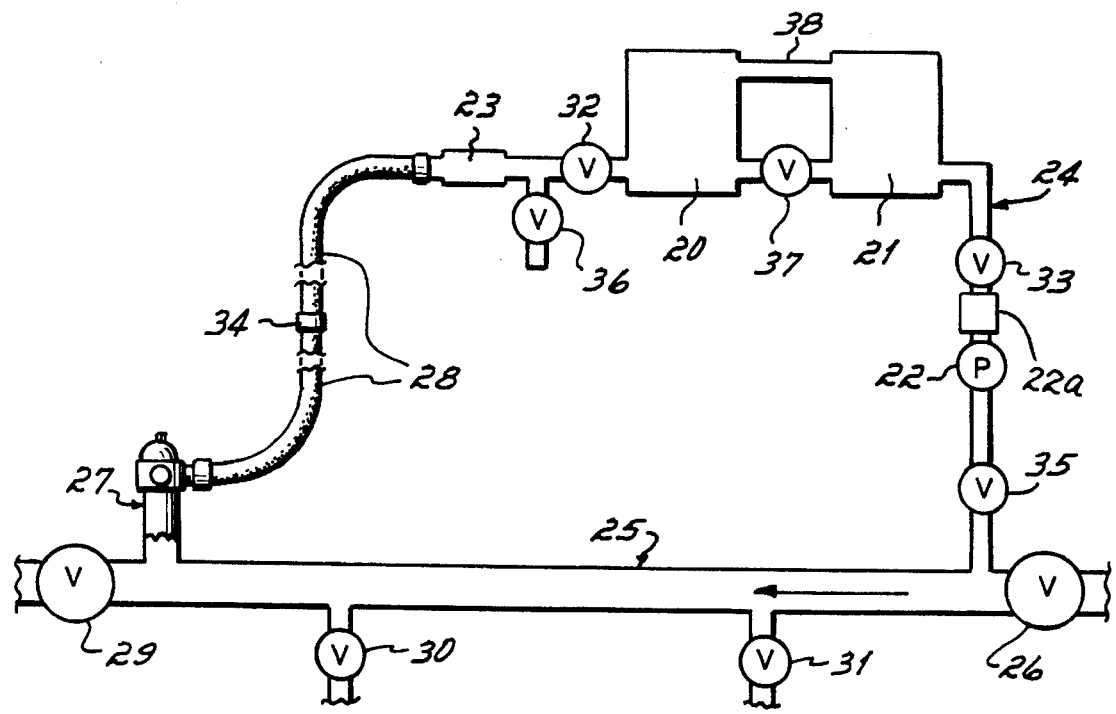
FIG. 2 is a diagram of a field system for cleaning a potable water distribution system.

With reference to FIG. 2, a field equipment and system diagram is shown which may be employed in the cleaning of a potable water pipe distribution system. Two 500 gallon treating solution reservoir tanks 20 and 21 along with a 100 gallon per minute circulation pump 22 and sight glass 23 are mounted on a flat bed truck (not shown). A heating means 22A is also shown. In this example, a 2½ inlet pipe 24 is secured to a 650 foot section of 6" water distribution pipe 25 after the main shut off valve 26. The fire hydrant 27 and fire hose 28 were employed for the acidic treating solution return to tanks 20 and 21.

The section of pipe 25 to be treated was isolated by closing off the two water main shut-off valves 26 and 29 along with all service line valves, typically 30 and 31. With valves 32 and 33 closed, 1000 gallons of acidic treating solution was prepared in tanks 20 and 21. With the coupling 34 open, the treating solution was allowed to enter the system by opening valves 33 and 35 and turning on the circulation pump 22. The pH of the water coming from the open coupling was then monitored until a decrease was noted which indicated the acid treating solution had displaced the water in the section to be treated. The circulation pump 22 was turned off and the coupling 34 connected. Valves 36 and 37 were then closed and valve 32 opened for circulation. The circulation pump 22 was then started again for the treatment period. Valve 37 was closed to allow for loosened solids to accumulate in tank 20 while the treating solution could overflow at 38 to tank 21 which reduces the chances of plugging during treatment.

The treating solution was then circulated in the system of FIG. 2 for a period of 5 hours at about 20° C. Observation of the treating solution through the sight glass 23 showed an increasingly darker discoloration with time. At the end of the treatment period, the circulation pump 22 was turned off, and valves 33 and 35 were closed. The main shut-off valve 26 was slowly opened and fresh water allowed to enter the system until the treating solution was displaced as noted when the tanks 20 and 21 were full. Valve 32 was then closed. The fire hose 28 was then disconnected from the fire hydrant 27 and the main shut-off valve 26 opened full to allow high pressure flushing of the treated water main 25. As the flush water emerged from the fire hydrant 27 it was dark in color with considerable tuberculation or scale and sediment solids. Flushing continued until the flush water was clean of solids for a period of time prior to putting the treated section of the water distribution system back into service.

The flow rate through the fire hydrant 27 prior to treatment had been determined by a Pitot Gauge to be 588 gallons per minute. After treatment, the flow rate was determined to be 790 gallons per minute. This was an increase of 34.5%.

Also, improved mechanical operations of the hydrants and valves of the system were achieved. The flow of cleaning solution may also be reversed in the system to further improve cleaning efficiency. The above cleaning solutions met the requirements of the National Sanitation Foundation (NSF International, Ann Arbor, Mich.), Standard 60 for potable water distribution systems.

DETAILED DESCRIPTION OF PREFERRED EMBODIMENT

Other examples of cleaning solutions may be employed as follows:

| Preblend Ingredients | % by wt |
| --- | --- |
| 31% Hydrochloric acid in water | 87.14 +/− 2% |
| 70% Glycolic acid in water | 5.27 +/− 0.3% |
| 40% Sodium xylene sulfonate in water | 2.06 +/− 0.2% |
| Triethanolamine and diethanolamine mixture (85%/15%) | 2.96 +/− 0.2% |
| Water | 2.57 +/− 0.2% |

In a preferred form of the invention, the above preblended cleaning solution is used in an amount of about 12.5% by weight with water in the field for cleaning an underground potable water distribution pipe system. However, more generally, the solution may be employed in amounts of from about 5 to about 50% by weight with water in the field, depending upon such variables as the amount of tuberculation or scale, pipe volume to be cleaned, circulation time and other factors. The amounts of anhydrous chemicals in a broader range of ingredients are about 1% to 27% HCl, 0.1% to 10% glycolic acid, 0.04% to 5% sodium xylene sulfonate and about 0.1% to 5% of the triethanolamine/diethanolomine mixture (hereinafter referred to as "TEA").

It should be understood that the above chemical ingredients may be blended for cleaning the underground pipes, for example, hydrochloric acid may be added to a concentrate of the glycolic acid, sodium xylene sulfonate and TEA. In the potable water distribution systems, an underground section of the pipe to be cleaned is sealed off from the rest of the system. As illustrated above in FIG. 2, the cleaning solution is then introduced from a tank into the pipe section and, if water is in that section of pipe, it is removed upon the introduction of the cleaning solution. After the cleaning solution has been introduced into the pipe section, circulation of the cleaning solution through the underground pipe is initiated for a sufficient period of time for solubilization, loosening and/or suspension of the scale, tuberculation and sediments.

In the above preblends, a soap having a 1:1 stoichiometric equivalent of the acid (HCl and glycolic acid) and TEA base is formed with an excess of the acid. This composition has been found to work effectively in the field for the removal of scale and tuberculation associated with iron bacteria consisting primarily of iron oxide, biomass and sediment. These 1:1 soaps have also been described in the above referred to co-pending application Ser. No. 07/700,780, filed May 16, 1991, now U.S. Pat. No. 5,322,635 and the disclosure thereof is incorporated herein in its entirety by reference. These soaps may be more generally categorized as soaps of mineral and/or organic acids and a base such as an amine and ammonia. Further examples of these soaps include 1:1 soaps of TEA and glycolic acid (also known as hydroxyacetic acid); TEA and acetic acid; TEA and citric acid; TEA and benzoic acid; hydrochloric acid and ammonia; sulfuric acid and ammonia; nitric acid and ammonia; TEA and hydrochloric acid; TEA and sulfuric acid; TEA and nitric acid; ammonia and glycolic acid; ammonia and benzoic acid; and ammonia and p-toluenesulfonic acid. Accordingly, it will be understood that other cleaning solutions of the acidic type employing 1:1 soaps may be employed to effectively solubilize, loosen and/or suspend the scale, tuberculation and sediment from the potable pipe in accordance with the principles of this invention.

The comparative effects of elevated and ambient temperatures are illustrated by the following examples.

EXAMPLE 1: CLEANING OF TUBERCULATION FROM POTABLE WATER DISTRIBUTION PIPE AT AMBIENT AND ELEVATED TEMPERATURES

A 4" diameter potable water distribution pipe obtained from a town in Arizona having up to 1" of tuberculation on the inside pipe wall was cut into two 2-foot lengths for cleaning on the pipe testing station. The tuberculation consisted primarily of iron oxide, manganese oxide and biomass.

AMBIENT TEMPERATURE CLEANING

One section of the pipe was mounted in the pipe cleaning test station. A treating solution was prepared by mixing the "Preblend Ingredients" (by wt.) of 87% muriatic acid, 5% glycolic acid, 2% sodium xylene sulfonate, 3% triethanolamine/diethanolamine mixture, and water in the test station mixing tank. The treating solution was then circulated through the pipe section at ambient temperature using an electric 110 gallon/minute swimming pool circulating pump.

The test was run for 5 hours and the pipe section was inspected. Considerable tuberculation was still present.

The test was continued for another 3¾ hours and inspected again. Tuberculation persisted.

The test was continued for another 4¼ hours and inspected. About 95% of the tuberculation had been removed from the interior surface of the pipe section.

ELEVATED TEMPERATURE CLEANING

The second section of the pipe was mounted and cleaned in the same manner except that a gasoline engine driven pump was employed. The pump was mounted on the crank case of the engine which caused the pump and the circulating treating solution to be heated during the test. The pump was rated at 155 gallons per minute.

The test was run for 1¼ hours at which time the treating solution was hot to the touch and estimated to be about 75–80 degrees centigrade. Upon inspection of the pipe section, the interior wall of the pipe was essentially as clean as the pipe section cleaned at ambient temperature for 13 hours.

EXAMPLE 2: CLEANING OF TUBERCULATION FROM A HEAVILY TUBERCULATED WATER DISTRIBUTION PIPE BY AMBIENT TEMPERATURE CLEANING FOLLOWED BY ELEVATED TEMPERATURE CLEANING

A 6" diameter 3' length potable water distribution pipe obtained from a town in Massachusetts having heavy tuberculation of about 2" to 2½" in thickness (opening was about 1½" to 2") was mounted on the pipe cleaning test station. The tuberculation consisted essentially of iron and manganese oxides, biomass and sulfate-reducing bacteria. A treating solution was prepared as in Example 1.

Circulation was begun using the electric 110 gallon per minute circulation pump at ambient temperature. The test was run for 11 hours and the pipe section inspected. Heavy tuberculation remained, about ½" of tuberculation had been removed.

Additional cleaning composition was added to the treating solution thus doubling the concentration of the treating solution. Circulation was continued at ambient temperature for an additional 7 hours and the pipe section inspected again. The tuberculation was still heavy and was about 1 to 1½" thick on the interior pipe wall.

At this point the electric pump was replaced by the gasoline engine pump which heated the treating solution. The temperature of the treating solution was controlled by the circulation time. Circulation was continued for 30 minutes at which time the treating solution was 42 degrees C. Circulation was then discontinued and the pipe section drained of treating solution. After the treating solution cooled to room temperature, circulation was again started for a period of one hour at which time the treating solution was 50 degrees C. Circulation was again discontinued and the pipe section drained of treating solution. The next day the circulation was again continued for a period of ¾ hours at which time the temperature of the treating solution was about 50 degrees C. The circulation was then discontinued and the pipe section inspected. A small amount of soft residue was in the pipe which was removed with a water flush from a hose. The pipe was clean of tuberculation.

In this example, about 25% of the cross sectional area of tuberculation was removed after 18 hours of ambient temperature treating solution circulation and about 75% of the cross sectional area of tuberculation was removed by 2¼ hours of periodic elevated temperature treating solution circulation as described above.

In view of the above detailed description, other method variations to clean domestic and industrial water distribution systems, like houses, hotels, plants, offices, etc., will be apparent to a person of ordinary skill in the art without departing from the scope of this invention. The method is especially advantageous in cleaning underground potable water distribution systems having tuberculation or scale associated with iron and manganese bacteria consisting primarily of iron oxide and manganese oxides, biomass and sediment.

What is claimed is:

1. A method for cleaning an underground water distribution system having a scale associated with sulfate-reducing manganese or iron bacteria comprising introducing an effective amount of an aqueous cleaning solution for the removal of said scale associated with sulfate-reducing, manganese or iron bacteria consisting primarily of iron or manganese oxide, biomass and sediment from inside surfaces of an underground water distribution system, said solution selected from the group consisting of acidic, neutral and basic solution, sealing off an underground section of pipe in said system for circulation of said cleaning solution therethrough, heating said cleaning solution to an elevated temperature of about 40° C. to about 80° C., circulating said heated cleaning solution through said underground section of pipe in said system for a sufficient period of time for solubilization, loosening and/or suspension of said scale and sediment, flushing said cleaning solution containing solubilized, loosened or suspended scale and sediment from said underground pipe section in said system.

2. The method of claim 1 wherein said temperature is on the order of about 40° to about 50° C.

3. The method of claim 1 comprising the further step of flushing said system with clean water after the removal of the spent cleaning solution.

4. The method of claim 1 comprising the further step of flushing said system with high pressure water for the removal of any spent cleaning solution, scale and/or sediment.

5. The method of claim 1 wherein said aqueous treatment solution is acidic.

6. The method of claim 5 wherein said acid solution contains further additives selected from the group consisting of acid inhibitors, chelating agents, surfactants, penetrating agents and dispersing agents, and mixtures thereof to assist in the removal of said scale and sediment.

7. The method of claim 5 wherein said acid is selected from the group consisting of mineral and organic acids and mixtures thereof.

8. The method of claim 7 wherein said mineral acid is selected from the group consisting of hydrochloric, nitric, phosphoric, polyphosphoric, hydrofluoric, boric, sulfuric, and sulfurous, and mixtures thereof.

9. The method of claim 7 wherein said organic acid is selected from the group consisting of formic, acetic, propionic, citric, glycolic, lactic, tartaric, polyacrylic, succinic, p-toluenesulfonic, and mixtures thereof.

10. The method of claim 7 wherein said solution further contains an additive from the group consisting of acid inhibitors, chelating agents, surfactants, penetrating agents and dispersing agents, and mixtures thereof to assist in the removal of said scale and sediment.

11. The method of claim 1 wherein said cleaning solution is a mixture of hydrochloric acid, glycolic acid, and alkanolamine and a surfactant.

12. The method of claim 11 wherein said mixture is employed in a preblend as the aqueous cleaning solution.

13. The method of claim 1 wherein said cleaning solution contains a soap having a 1:1 stoichiometric equivalent of an acid and a base wherein said acid is selected from the group consisting a mineral acid and an organic acid and said base is selected from a group consisting of an amine and ammonia, wherein an effective amount of free acid is present in the solution to react with said scale.

14. A method for cleaning a potable underground water distribution pipe system having a scale associated with sulfate-reducing manganese or iron bacteria comprising providing a reservoir for containing an aqueous acidic cleaning solution for the removal of said scale associated with sulfate-reducing, manganese or iron bacteria consisting primarily of iron or manganese oxide, biomass and sediment from inside pipe surfaces of a potable underground water distribution pipe system, sealing off an underground section of pipe in said system for circulation of said cleaning solution therethrough, heating said cleaning solution to an elevated temperature of about 40° C. to about 80° C., circulating said heated cleaning solution from said reservoir through said underground pipe section and returning said solution to said reservoir for the removal of said scale and sediment.

15. The method of claim 14 wherein said cleaning solution is a mixture of hydrochloric acid, glycolic acid, and alkanolamine and a surfactant.

16. The method of claim 14 wherein said cleaning solution contains a soap having a 1:1 stoichiometric equivalent of an acid and a base wherein said acid is selected from the group consisting a mineral acid and an organic acid and said base is selected from a group consisting of an amine and ammonia, wherein an effective amount of free acid is present in the solution to react with said scale.

17. A method of claim 16 wherein said mineral acid is selected from a group consisting of hydrochloric, nitric, phosphoric, polyphosphoric, hydrofluoric, boric, sulfuric and sulphurous, mixtures thereof, and said organic acid as selected from the group consisting of formic, acetic, propionic, citric, glycolic, lactic, tartaric, polyacrylic, succinic, poly-toluenesulfonic and mixtures thereof.

18. The method of claim 14 wherein said reservoir is truck mounted for makeup, storage and disposal of cleaning solution.

19. The method of claim 14 by sealing said pipe section between two fire hydrants and circulating said cleaning solution by connecting one of said fire hydrants to said reservoir for pumping said cleaning solution therethrough.

20. The method of claim 14 wherein said pipe distribution system is domestic or industrial water distribution system.

21. The method of claim 14 comprising the further step of flushing said pipe system with clean water after the removal of spent cleaning solution.

22. The method of claim 14 wherein said aqueous treatment solution meets the requirements of the National Sanitation Foundation Standard 60 for potable water distribution systems.

23. The method of claim 14 wherein said temperature is on the order of about 40° to about 50° C.

* * * * *

UNITED STATES PATENT AND TRADEMARK OFFICE
CERTIFICATE OF CORRECTION

PATENT NO.   :  5,527,395
DATED        :  June 18, 1996
INVENTOR(S) :  Edward C. Perry, et al.

It is certified that error appears in the above-indentified patent and that said Letters Patent is hereby corrected as shown below:

Title page, item [21],      should be --Appl. No.: 262,601--
"Appl. No.: 626,601"

Signed and Sealed this

Twenty-second Day of October, 1996

Attest:

BRUCE LEHMAN

*Attesting Officer*      *Commissioner of Patents and Trademarks*